May 1, 1962  G. WELCH  3,032,752
COMBINATION RAPID BALANCE BRIDGE AND CODE GENERATOR
Filed Feb. 26, 1960  9 Sheets-Sheet 1

FIG-1

INVENTOR
GLENN WELCH

BY *Richard C. Reed*

ATTORNEY

May 1, 1962 G. WELCH 3,032,752
COMBINATION RAPID BALANCE BRIDGE AND CODE GENERATOR
Filed Feb. 26, 1960 9 Sheets-Sheet 9

INVENTOR
GLENN WELCH

BY *Richard C. Reed*

ATTORNEY

3,032,752
Patented May 1, 1962

3,032,752
COMBINATION RAPID BALANCE BRIDGE AND CODE GENERATOR
Glenn Welch, 52 Highland Place, Indian Head, Md.
Filed Feb. 26, 1960, Ser. No. 11,387
30 Claims. (Cl. 340—204)
(Granted under Title 35, U.S. Code (1952), sec. 266)

The invention described herein may be manufactured and used by or for the Government of the United States of America for governmental purposes without the payment of any royalties thereon or therefor.

This invention relates in general to an encoding and control circuit and in particular to one for a telemetering system.

It is frequently desired in a telemetering system to transmit signals from a remote point to indicate the value of parameters such as humidity or pressure. One arrangement in the prior art provides a motor and a Wheatstone bridge for each parameter to be evaluated. The motor, driving a potentiometer in the bridge, balances the latter so that an arm, attached to the motor shaft, is positioned over one of a group of code selecting elements. Since each element is connected in series with a set of segments representing a code letter on a commutator, when the arms are sequentially clamped to the selected elements, the associated segments are grounded. At the same time, a read out arm is rotated on the commutator sequentially generating signals indicative of the grounded elements and magnitude of evaluated parameters.

This arrangement has several disadvantages. It requires a Wheatstone bridge, motor, and group of code selecting contacts for each parameter transmitted and a complicated mechanical system for clamping the arms and sequentially applying potential to the various bridges. Since a motor is directly coupled to the balancing potentiometer and must be started and stopped to balance each bridge, the latter cannot be balanced rapidly due to the inertia of the system. Further, when this arrangement is used in a transosonde system at least three aneroid cells are required, one for each of the following functions: dropping ballast and blowing air controlling the transmission of pressure signals, and termination of functions. Similarly, four servomotors are required for: humidity readings, temperature readings, ballast control, and main program drive.

Accordingly, it is an object of the present invention to provide an encoding device employing a bridge that may be rapidly balanced.

Another object is to provide a control unit for a telemetering system requiring only one aneroid cell, one motor and a minimum number of components in a bridge circuit for controllong the various functions performed by the system.

Other objects of this invention will be readily appreciated as the same becomes better understood by reference to the following description when considered in connection with the drawings in which like reference numerals designate like parts throughout the figures and wherein:

FIG. 2 is a block diagram disclosing the manner in which FIGS. 3 to 7 are assembled to provide a drawing of the embodiment.

FIGS. 3 to 7 disclose a circuit diagram of the embodiment.

In accordance with the teachings of the present invention, in evaluating and transmitting signals representative of selected parameters, a read out arm, coupled to a code selector arm, rotates the latter around a commutator. As the arms rotate, a bridge circuit is balanced releasing the coupling in dependency upon the magnitude of a desired parameter. When the code selector arm stops rotating, segments are selected representing the value of the parameter as indicated by the position of the arm. Continuing to rotate, the read out arm first generates signals indicating the parameter evaluated and then sweeping the selected segments generates signals indicating the value of the parameter. These signals are used to modulate a transmitter.

When the subcombination presented above is combined with a control circuit in a transosonde system, a single aneroid cell may be used to effect transmission of signals representing pressure and to control such functions as ballast release and termination of operation.

More specifically, the control circuit utilized includes a rotating disc having at least one surface of nonconductive material and a plurality of first conductive areas, each positioned in the surface between a respective pair of second conductive areas. All the first areas are connected together and all the second conductive areas are connected together. This arrangement is referred to below as "interleaved spirals." The surface also includes a first and second ring of conductive material and a pressure spiral located between one of the first and second areas. A grounded pin arm, controlled by an aneroid cell, has a sensing element in contact with the surface of the disc and a control arm, positioned in contact with a knob on the former, is shaped so that it cannot assume a selected control position when the balloon bearing the transosonde system is ascending. As the balloon ascends, the control arm is rendered ineffective, since it may not assume the control position, and the pressure spiral may be used in an appropriate circuit to control the code selector arm in the transmission of signals indicating the pressure at different levels. When the balloon attains a desired altitude, the first and second rings are used in an associated circuit to control an air blower and to drop ballast, respectively, thereby maintaining the balloon within a predetermined range of altitude. After a selected time interval, should the balloon fail to attain or descend below the desired range, the first conductive areas, sensed by the pin arm in an appropriate circuit, effect termination of operation, that is detonate a squib which releases the transosonde system from the balloon. The same circuit will flash a set of lights as the system is parachuted to earth. At the same time, to insure termination of operation, since the control arm is now in the control position, the latter and the pin arm cooperate in a common circuit to detonate an auxiliary squib which will accomplish the same results as the detonation of the first mentioned squib. Likewise, should the balloon fail to attain a desired altitude in a selected time interval, the first squib will be detonated to release the transosonde system from the balloon.

In the drawings, all relays and relay armatures are shown in their deenergized positions. Relays are designated by Ry followed by a numeral, for example Ry1, and relay armatures are designated by the representation of the associated relay followed by a numeral indicating the armature so that the first armature of relay Ry1–1. Dotted lines connect each relay and its associated armatures.

Figure 1:
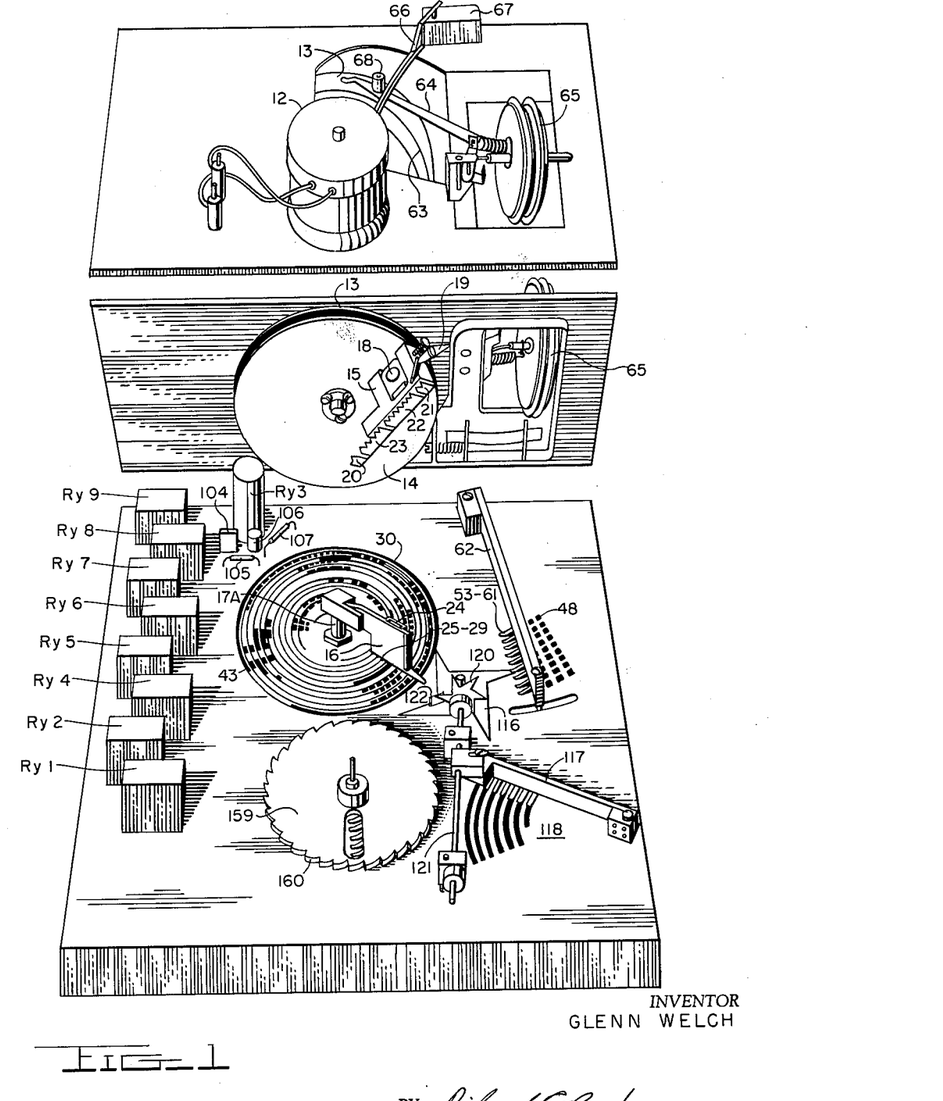
FIG. 1 is a perspective of an embodiment of the present invention.
Figures 2, 3:
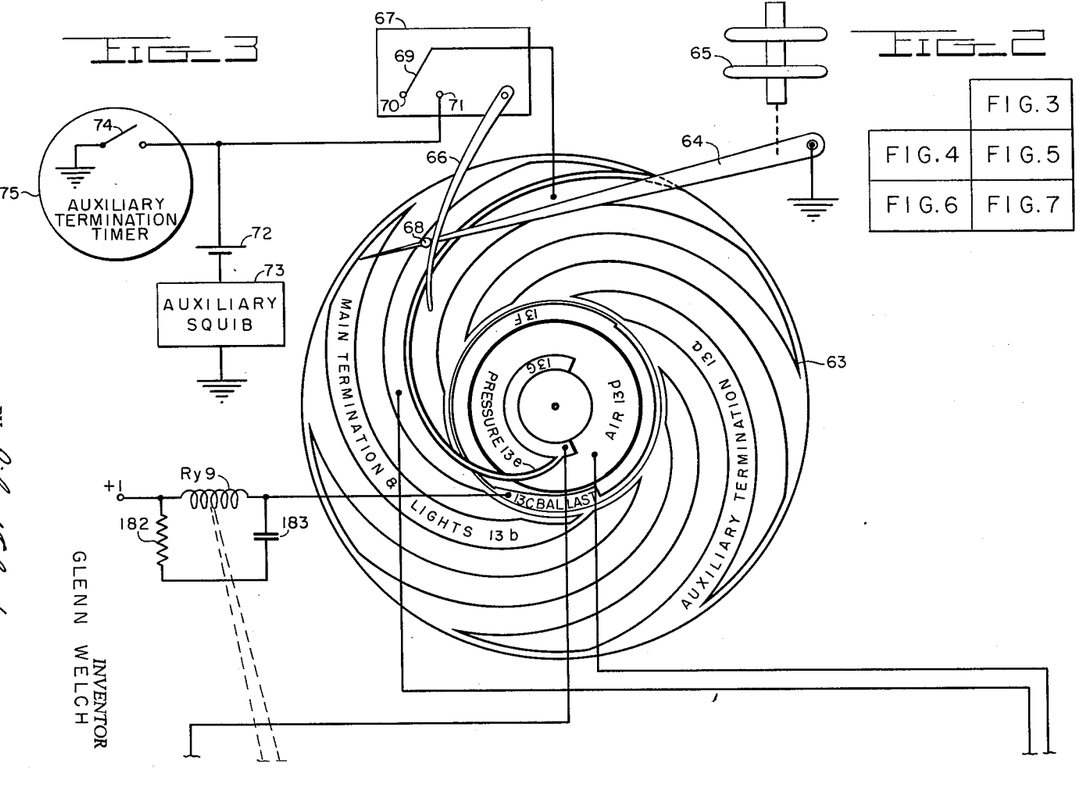
Figure 6:
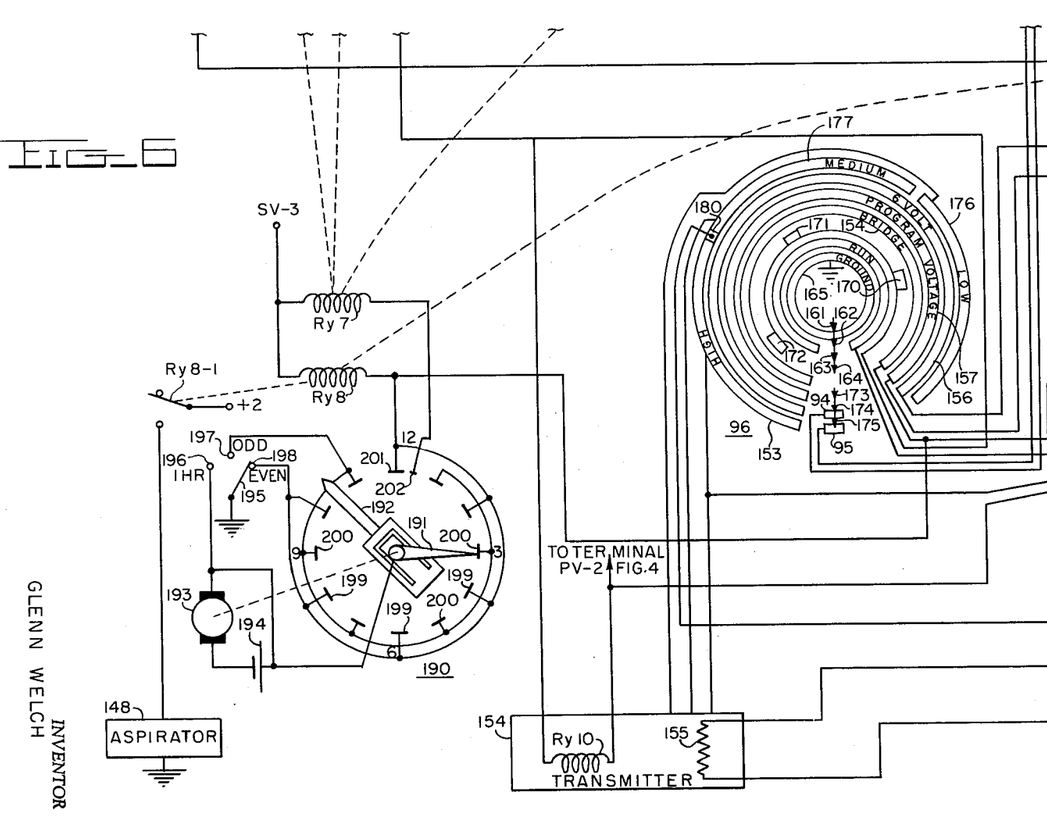
Figure 7:
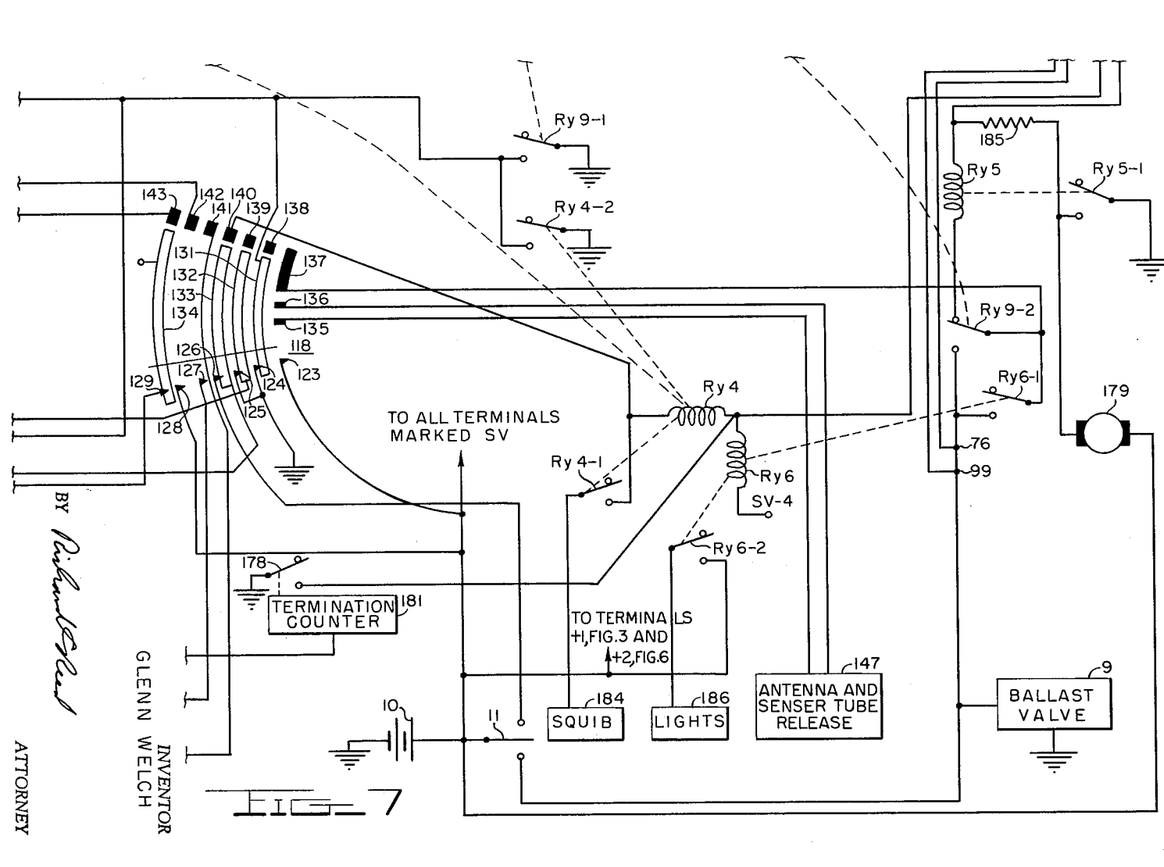

Referring to FIGS. 1 to 7, source of D.C. potential 10 in FIG. 7 is connected to terminal +1 in FIG. 3, terminal +2 in FIG. 6, and through switch 11, when in the upper position in FIG. 7, to terminals SV-1 to SV-6 located in the various figures. When in the lower position, the switch is connected to ground through ballast valve 9. Terminal SV-1 in FIG. 3 is connected through armature Ry1-1 to motor 12 which drives disc 13 in FIGS. 1, 3 and disc 14 in FIG. 1. Motor 12 may be a 20 r.p.m., 6 v. D.C. motor.

Figure 4:
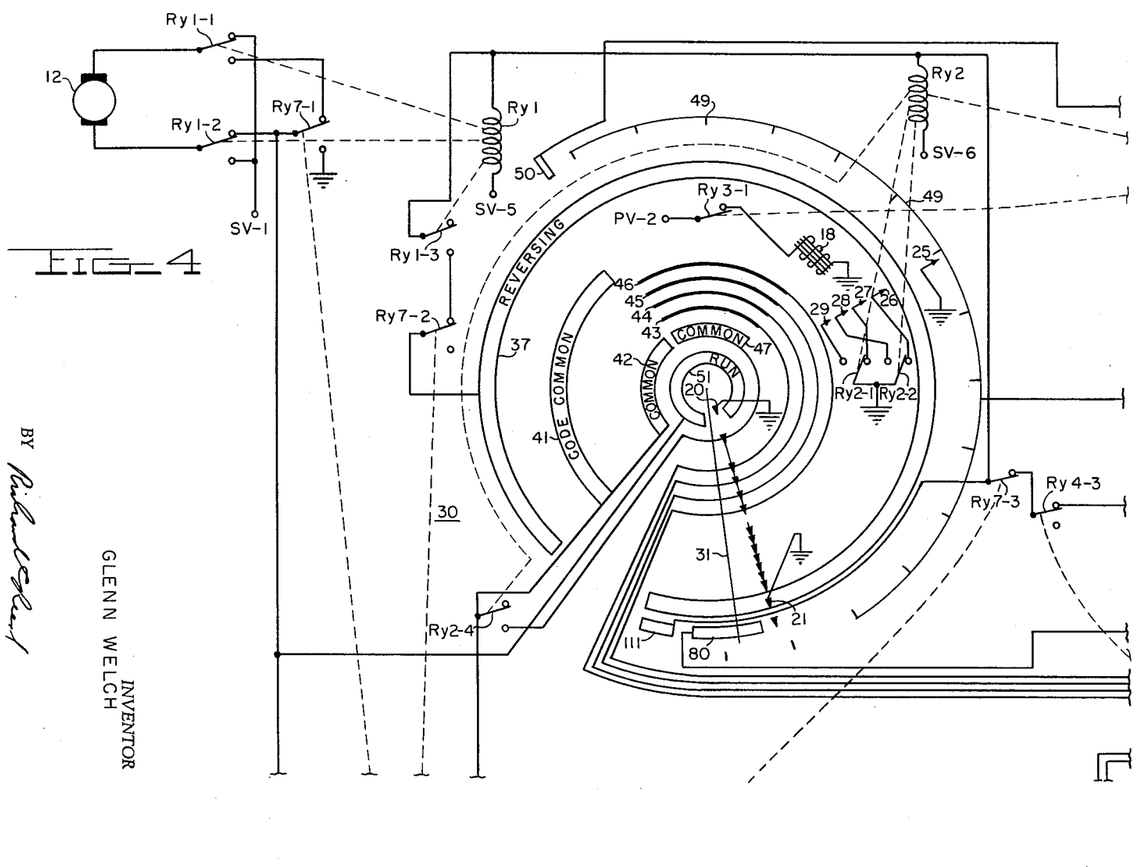

Readout arm 15, positioned on disc 14, engages code selector arm 16, which is located on the shaft of variable resistor 17. The latter, shown in FIG. 5, may be a 10K wirewound potentiometer having in the order of 4 turns per angular degree. Read out arm 15 supports electromagnet 18, hinged extension 19, brush 20 and brush sets 21, 22, and 23, the brush sets having two, seven, and five brushes, respectively. The brushes in each set are tied together while brush 20 and brush set 21 are grounded. Code selector arm 16 supports slab of magnetizable material 24 and brushes 25 to 29; brush 25 is grounded, brushes 26 and 27 may be grounded through armature Ry2-2 and brushes 28 and 29 through armatures Ry2-1, as shown in FIG. 4. The brushes on read out arm 15 and code selector arm 16 are positioned in contact with the various rings and segments on main commutator 30, and electromagnet 18 on read out arm 15 may be positioned in contact with slab of magnetizable material 24 on code selector arm 16. Thus, when the electromagnet is energized the read out arm is magnetically coupled to the code selector arm. It is understood that a wide variety of coupling arrangements, for example, a solenoid operated latch, could be used in place of the magnetic coupling disclosed. Brush 20, brush sets 21 to 23 are shown in the start position in FIG. 4 and line 31 indicates the start position of brushes 25 to 29.

Figure 8:
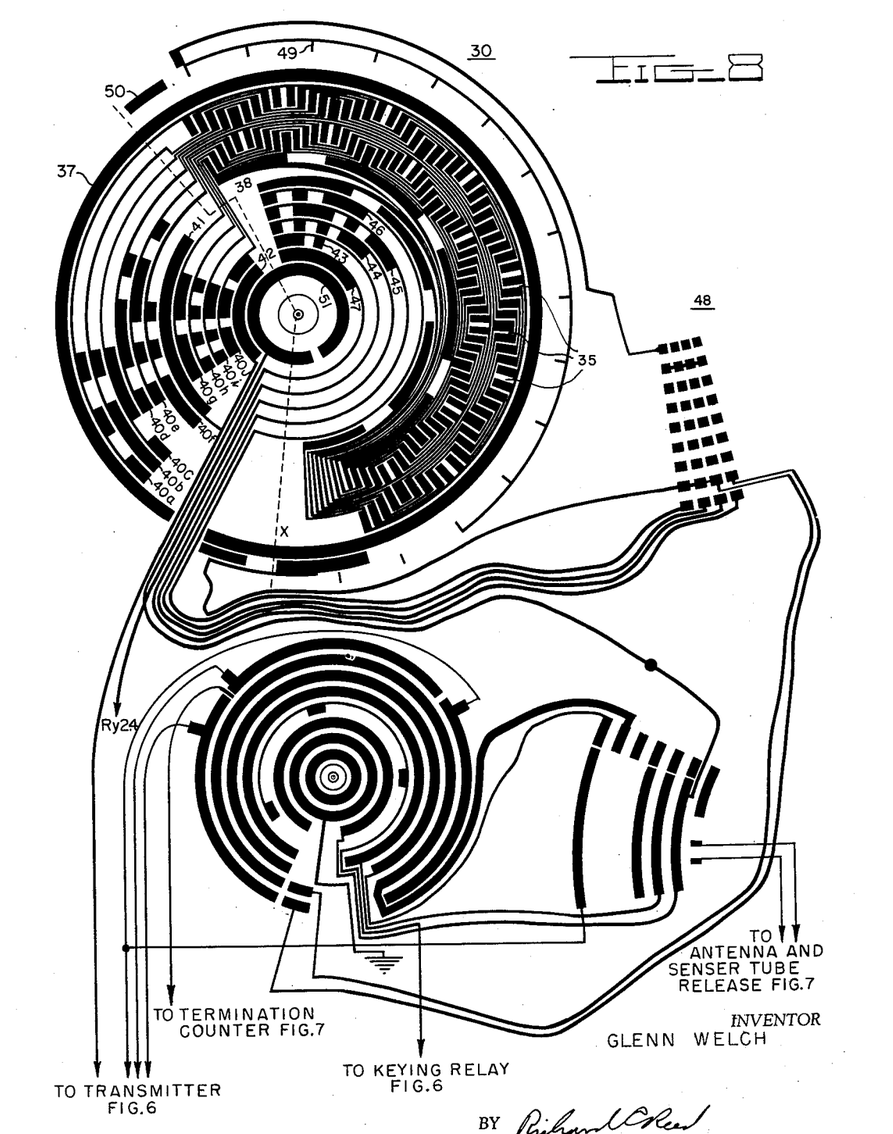
FIG. 8 shows the parameter commutator as well as main, programmer, and timer commutators employed in the embodiment.
Figure 9:
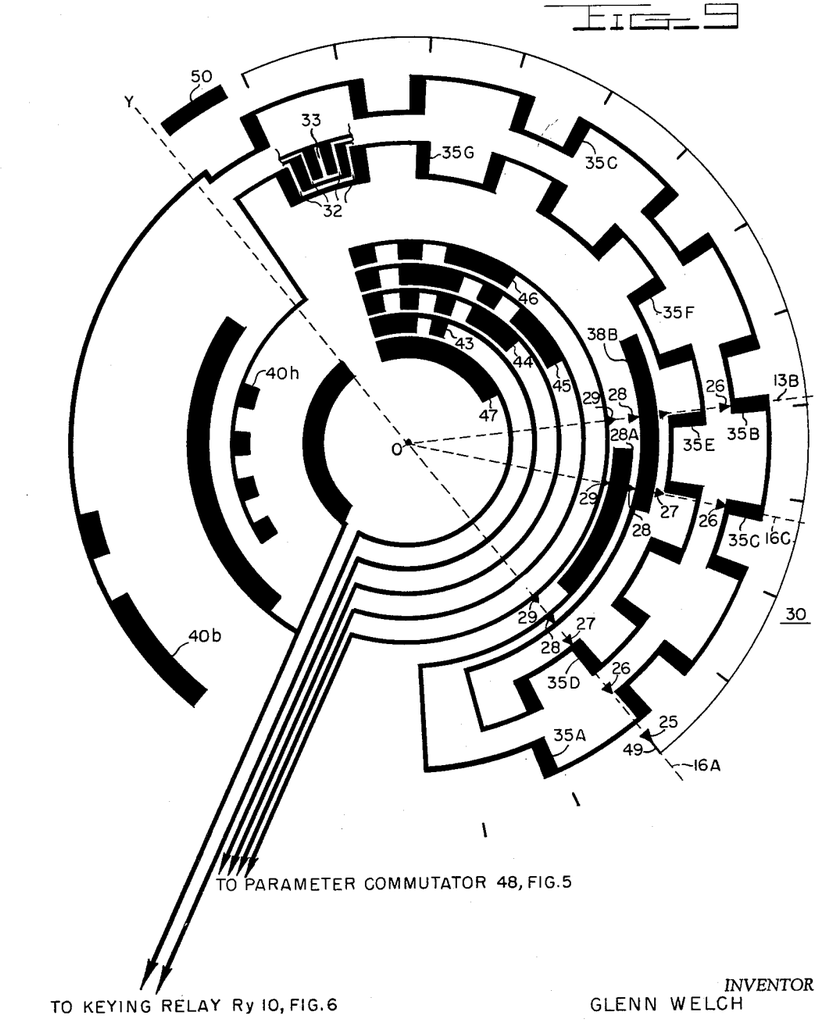
FIG. 9 is a detail of the main commutator shown in FIG. 8.

Referring to FIGS. 8 and 9, fine code segments 35 and 35A to 35D are located on main commutator 30 to the right of lines OX and OY and between reversing ring 37 and coarse segments 38, 38A and 38B. Each coarse segment is connected in series with a respective group of fine code segments and the segments in a respective one of rings 40a to 40j, each ring designating a letter in Morse code. Rings 40a to 40f are shown to the left of the lines OX, OY between reversing ring 37 and common segment 41, and likewise rings 40g to 40j are shown to the left of lines OX, OY between common segments 41 and 42. As an example, in FIG. 9 coarse segment 38A is connected in series with fine code segments 35, 35B and 35C and segments 40b: coarse code segment 38B is connected in series with fine code segments 35D to 35G and code segments 40h. Common segments 41 and 42 are connected to relay Ry10 in FIG. 6, while common segment 47 is connected through armature Ry2-4 to relay Ry10 when relay Ry2 is energized. Rings 43 to 46 are found to the right of lines OX, OY and between fine code segments 35 and common segment 47. The segments in each of these rings are connected in series and to a respective one of segments D-9 to A-9 in parameter commutator 48, FIG. 5. Finally, the main commutator 30 contains stop segment 50, identification segments 49 and run ring 51. Stop segment 50 is connected through relay Ry3, armature Ry8-3, when relay Ry8 is energized, source of D.C. potential 101 to ground. Run ring 51 is connected to ground through armatures Ry4-2 and Ry9-1 when relays Ry4 and/or Ry9 are energized.

Figure 11:
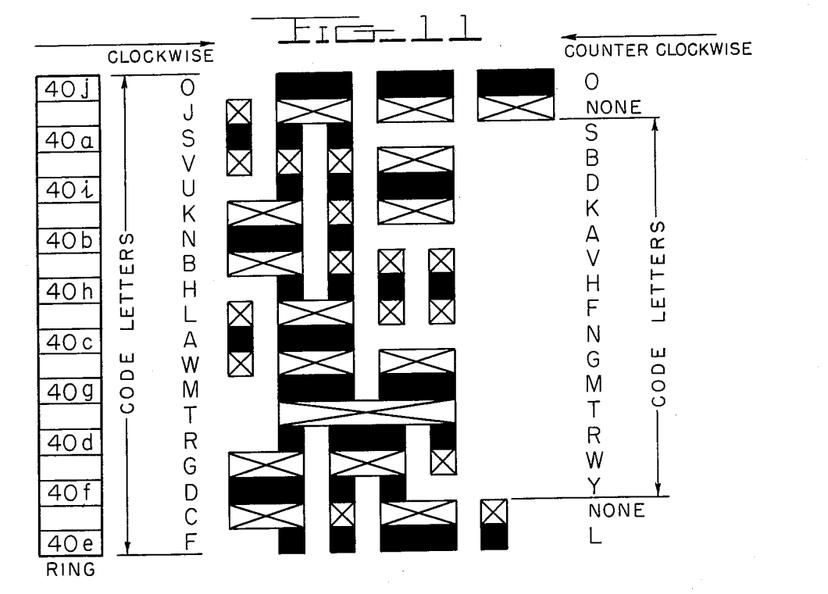
FIG. 11 discloses the code letters selected for representing the signals employed in the embodiment.

Referring to FIG. 11 the black rectangles present the relationship between each ring 40a to 40j and a respective Morse code letter generated when an associated fine segment 35 is grounded and read out arm 15 sweeps the ring in the manner indicated below. Similarly the crossed rectangles represent the "composite" Morse code letter generated when a pair of rings 40a to 40j are grounded simultaneously. The chart is read out from left to right when the ring or rings are read out clockwise and from left to right when read out counterclockwise. Thus, if ring 40i is grounded through one of the fine code segments 35 and brush 27, as the read out arm 15 rotates clockwise, the signals representing the letter U in Morse code will be generated: and if the same ring is grounded through one of the coarse segments 38 and brush 28 as the read out arm rotates counter-clockwise, the Morse code letter D is generated. When rings 40a and 40i are grounded simultaneously, as the read out arm rotates clockwise, a "composite" letter V is generated: as the arm rotates counterclockwise, the "composite" letter B is generated.

Referring to FIG. 8, the small white areas 32, which are indicated in detail in FIG. 9, in commutator 30 are selected to subtend an angle of 0.737 degree: the larger white areas 33, and angle of 1.4736 degrees: and the largest white areas, each located between a pair of coarse segments 38, 38A or 38B, subtend an angle of 14 degrees. Each small fine segment, e.g., segment 35F, subtends an angle of 1.8736 degrees: each larger fine segment, e.g., 35G, subtends an angle of 2.211 degrees: and each coarse segment, except two, i.e., segments 38F, 38G, subtend an angle of 42 degrees. Coarse segment 38F subtends an angle of 28 degrees and the effective portion of coarse segment 38G, that is the portion cooperating with fine segments 35, subtend an angle of 14 degrees.

Referring to FIG. 11 when code selector arm 16 is positioned so that the segments in ring 40f are grounded through brush 27 and a segment 35 as read out arm 15 rotates clockwise, signals standing for the Morse code letter D are generated in the manner presented below. As the read out arm rotates counterclockwise, if the code segments in ring 40g are grounded through brush 29 a coarse code segment 38, signals representing the letter M are generated. In another example, when code selector arm 16 is positioned to ground rings 40e, 40f simultaneously, as read out arm 15 rotates clockwise, "composite" letter C is developed and as the read out arm rotates counterclockwise, since only the segments in ring 40f are grounded, signal for the Morse code letter U are generated "composite" code letter T is generated. In a similar manner, it can be shown that depending upon the position of code selector arm 16, each of the letters and "composite" letters in the chart in FIG. 12 will be generated as read out arm 15 rotates either clockwise or counterclockwise. The angular resolving power of code selector arm 16 is 0.737 degree since one code letter is generated for each small white area 32 subtending an angle of 0.737 degree and two code letters for each larger white area 33 subtending a 1.4736 degree angle.

It is noted that as read out arm 15 rotates clockwise one of 19 code letters may be generated: as the read out arm rotates counterclockwise, one of 15 code letters may be generated. Thus, in the present embodiment 15×19 or 285 different letters or letter combinations are provided.

It is understood, of course, that other codes than the Morse code and a wide variety of patterns of coarse and fine segments could be used in practicing the present inventive concept, and that the numerical examples presented are merely for illustrative purposes and are not intended to limit the scope of the invention.

Figure 5:
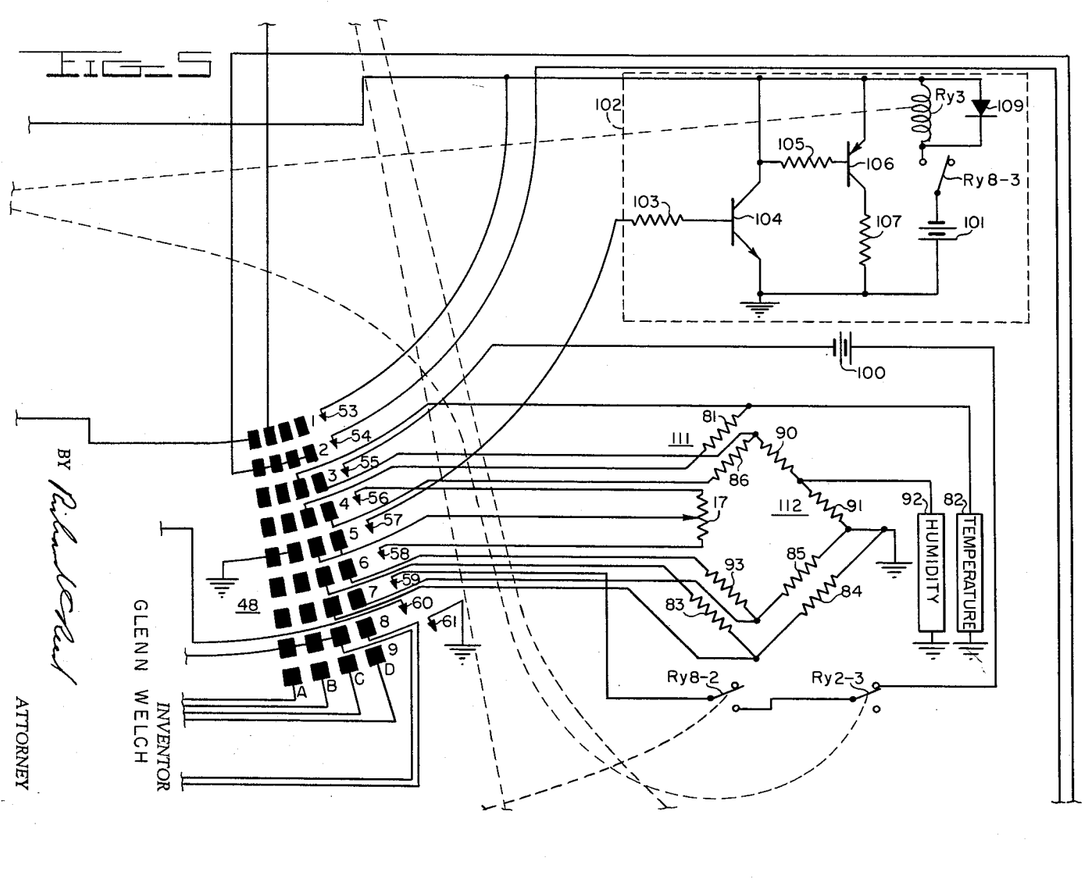

Referring to FIGS. 1 and 5, brushes 43 to 61 on arm 62 engage the segments on parameter commutator 48. Since a coordinate system is used to indicate the segments in the commutator, the one in the upper left hand corner is designated as A-1, the one in the third column from the left and fifth row from the top as C-5, etc.

In FIG. 3, the surface of disc 13, coated with conductive material, is prepared by well known printed circuit technique and divided into predetermined areas by lines 63 of nonconductive material. These areas include interleaved auxiliary termination spiral 13a, interleaved main termination and light spiral 13b, an air ring 13d, a ballast ring 13c, and segment 13g and pressure spiral 13e. Segment 13g is not sensed and ring 13f is not used in the present embodiment. Pin arm 64 is shown in the position assumed when atmospheric pressure at substantially sea level is applied to aneroid cells 65. The pin arm, which is mechanically coupled to the aneroid cells, is grounded at one end and has a pin at the other that rides on the surface of disc 13. Control arm 66, located on microswitch 67, controls armature 69 and is positioned behind knob 68 on pin arm 64 so that at sea level the armature of the microswitch is in the position shown. Terminal 70 is connected to the auxiliary termination spiral of disc 13 while terminal 71 is connected through source of D.C. potential 72 and auxiliary squib 73 to ground and through switch 74 in auxiliary termination timer 75 to ground. When the squib is detonated by the completion of either circuit to ground, the telemetering system is released from the balloon and parachuted to earth.

In FIGS. 3 to 7 the number and position of the identification segments 49 on main commutator 30 that are connected in series with segment A–1 of parameter commutator 48 is determined by the signals that are to be generated in the manner indicated below to identify the telemetering system in operation. Segment B–1 is connected to pressure segment 13e on disc 13. Segments A–2 to D–2 are connected in series with point 76 in FIG. 7; segments A–5 and B–5 to ground are connected to ground, and segments A–8 to C–8 form a series circuit with reversing segment 80 on main commutator 30 when brush 61 rests on one of the segments. Resistor 81 is positioned between segments C–3, C–4 and temperature element 82, which may be a thermistor, between segment C–3 to ground. Segment C–5 and D–5 are connected to the center tap of variable resistor 17. Segment C–6 is grounded through resistors 83 and 84, segment D–7 through resistor 85 and segment C–7 through resistor 84. Resistor 86 is positioned between segments D–3 and D–4 while segment D–3 is connected to ground through resistors 90 and 91 and is grounded through resistor 90 humidity sensor 92. The latter may be a carbon strip humidity element. Segments C–8 and D–8 are connected to segments 94 and 95, respectively, in programmer commutator 96, as shown in FIG. 6. Source of D.C. potential 100 is applied across brushes 55 and 59, when armatures Ry8–2 is in the lower position in FIG. 5. Variable resistor 17 is positioned across brushes 56 and 58. Brush 53 is connected to stop segment 50 in main commutator 30 in FIG. 4 and through relay Ry3, armature Ry8–3, when in the left hand position in FIG. 5, and source of D.C. potential 101 to ground. Brush 60 is connected through armatures Ry4–3, Ry7–3 to reversing segment 111 on main commutator 30. Brush 61 is grounded; and brush 54, when positioned on segment D–2, forms a loop with segments A–2 to D–2 and points 76 and 99 in FIG. 7.

As will become apparent from the discussion of a typical operation set forth below, by cutting the lines between points 76, 99 and one of the segments A–2 to O–2, it is possible to control the length of time during which ballast valve 9 is energized.

Referring to FIG. 5, brush 57 is connected to resistor 103 in a conventional transistor-amplifier in dotted rectangle 102. The amplifier is formed by connecting resistor 103 to the base of transistor 104, the emitter of the transistor to ground, and the collector through resistor 105 to the base of transistor 106. The collector of the latter is connected through resistor 107 to ground and the emitter is grounded through relay Ry3, armature Ry8–3, when in the closed position, and source of D.C. potential 101. Unilateral impedance device 109 is placed across relay Ry3 so that sparking that could burn out transistor 104, 106 will be suppressed.

When brushes 53 to 61 are positioned on segments C–1 to C–9, variable resistor 17, resistors 81, 83, 84 and temperature element 82 form Wheatstone bridge 111 and transistor-amplifier 102, connected between the center tap of variable resistor 17 and ground, functions as a null detector. Likewise, when brushes 53 to 61 engage segments D–1 to D–9, variable resistor 17, resistors 85, 86, 90, 91 and 93 constitute Wheatstone bridge 112 with humidity sensor 92 placed across resistor 91 to ground.

Figure 10:
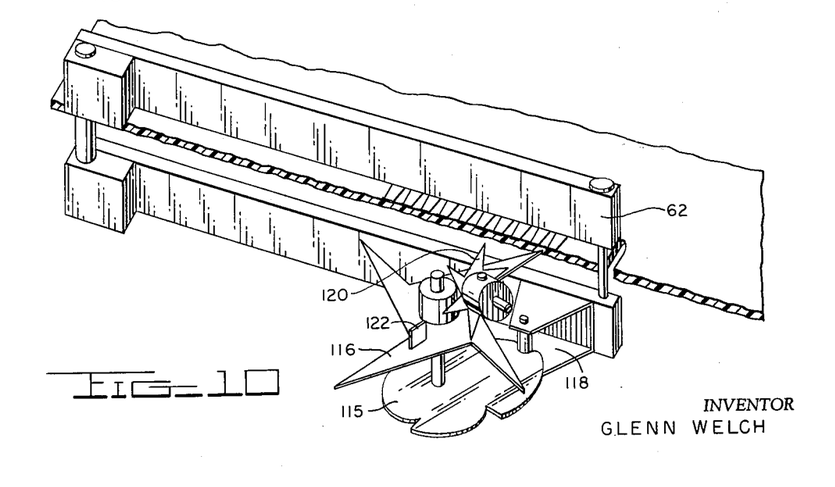
FIG. 10 is a detail of the perspective in FIG. 1.

Referring to FIGS. 1 and 10, cam 115 and star wheel 116 are located on a common shaft, as are the arms 62 and 117. Cam follower 118, positioned on arm 117, rides cam 115. Star wheel 116 is so positioned relative to read out arm 15 that during each clockwise rotation of the read out arm extension 19 (see FIG. 1) engages a tooth of the star wheel to advance the wheel one position. Extension 19 is hinged on the read out arm so that it will advance the star wheel only during clockwise rotation of the read out arm. The left hand portion of arm 117, as shown in FIG. 1, and wheel 120 are positioned on screw thread 121. Finally, extension 122, placed on star wheel 116, engages a tooth of wheel 120, during each fourth step of the star wheel to advance screw thread 121 and arm 117.

Referring to FIGS. 1 and 7, brushes 123 to 129 are positioned on arm 117 in contact with timer commutator 118. At the start of operation, brushes 124 to 126 engage segments 131 to 133, respectively. After ten minutes of operation, during which time arm 117 is advanced on screw thread 121, brush 123 engages segment 135 and shortly thereafter segment 136. After sixty-five minutes of operation, brush 123 engages segment 137. When the brush engages the segment 135 source of D.C. potential 10 is applied to a low resistance heating element in antenna and senser tube release 147 to sever a nylon cord connected across the resistance element. When the brush engages segment 136, the source of potential is again applied to the heating element insuring that the cord is severed. The nylon cord holds an antenna and senser tube not shown in the drawings, in position. The latter tube shields temperature element 82 and humidity sensor 92 from the sun and aspirator 148, located in the tube, draws air over the element and senser to measure the temperature and humidity of the atmosphere. The aspirator is shown in FIG. 6 in block form and the antenna, not disclosed in the drawings, may be a conventional trailing, end fed, half-wave antenna having a length including feeder of approximately 90 feet.

Referring to FIGS. 6 and 7, segment 131 in timer commutator 118 is connected to run ring 51 on main commutator 30, to motor 12 through armature Ry1–2 in FIG. 4, and to run ring 166 in programmer commutator 96 in FIG. 6. When switch 11 is thrown in the upper position in FIG. 7, source of D.C. potential 10 is applied through brush 126 to high frequency segment 133 in timer commutator 118 and from there to high frequency segment 153 in programmer commutator 96 and also to the filaments of the electron tubes in the high frequency section of transmitter 154. Similarly, source of D.C. potential 10 is applied through low and medium segments 176, 177 to the filaments in the low and medium sections in transmitter 154. Potential is applied through terminal SV–2, segment 134 and brush 129 in FIG. 7 through relay Ry10 in FIG. 6 to common segments 41 and 42 in main commutator 30, FIG. 1, and when relay Ry2 is energized, through armature Ry2–4 to common segment 47. Relay Ry10 functions as a keying relay in the screen grid circuit of the output tubes of transmitter 154. Terminal SV–3 in FIG. 6 is connected through relay Ry8 to bridge ring 154 in programmer commutator 96 and from relay Ry8 through segment 132 in timer commutator 118 and brush 125 to ground. Segment 137 in the timer commutator is connected through armature Ry6–1 and ballast valve 9 to ground whenever relay Ry6 is energized.

After one hundred minutes of operation: Brush 127 engages segment 141 to short out resistor 155 in transmitter 154, FIG. 6. Since this resistor is located in the circuit applying screen grid potential to the power output tubes of the transmitter, a higher potential is applied to the screens and greater power transmission is effected. Source of D.C. potential 10 is applied through switch 11, brush 126, segment 140, armature Ry4–1, when relay Ry4 is energized, to squib 184. Detonating squib 184 releases the telemetering system from the balloon so that it may parachute to earth. Finally, segments 138 and 139 may be grounded through brushes 124 and 125, respectively.

Although ten, sixty-five and one hundred minutes are used for performing the indicated functions in the present embodiment, it is understood, of course, that longer or shorter intervals may be selected in applying the present invention in a particular application.

Referring to FIGS. 1 and 6, teeth 160 are positioned around the periphery of wheel 159 and brushes 161 to 164, 173 to 175 are located on the underside of the wheel in FIG. 1. Brushes 161 to 164 are tied together as are brushes 173 to 175. As wheel 159 rotates, brushes 161, 162, and 164 engage ground ring 165, run ring 166, and bridge ring 154, respectively, and brush 163 senses segments 170 to 172. Similarly, brush 173 engages program voltage ring 157 while brush 174 senses segment 94 and 6 volt ring 156. Brush 174 sweeps a circular path that includes segment 95 high frequency segment 153, segment 180, medium frequency segment 177 and low frequency segment 176. Segment 180, located between frequency segments 153, 175 is connected to termination counter 181 in FIG. 7 which is a conventional one employing a relay and ratchet arrangement activated during each rotation of brush 175. After a predetermined number of activations, the termination counter closes switch 178 completing circuit from terminal SV–6 through relay Ry6 to ground.

In FIG. 3, terminal +1 is connected through relay Ry9 to ballast ring 13c on disc 13. Resistor 182 and capacitor 183 are connected in series across the relay.

In FIG. 7 potential is applied from source of D.C. potential 10 to one side of blower motor 179: the other side of the motor is connected through resistor 185, which is also in the locking circuit for relay Ry5, to air ring 13d on disc 13, FIG. 3. Resistor 185 is selected to have a value such that sufficient current is drawn through the locking circuit to permit relay Ry5 to be locked and yet too much current is not drawn by blower motor 179 when the relay is energized and armture Ry5–1 is in the lower position in FIG. 7.

In FIG. 3, the interleaved main termination and light spirals 13b on disc 13 are connected through relay Ry6 to point SV–4 in FIG. 7 so that when the relay is energized armature Ry6–2 is closed to apply potential from source of D.C. potential 10 to lights 186.

Referring to FIG. 6, clock 190 may be a conventional twelve hour, D.C. clock having an hour hand 191 and a minute hand 192. The clock is driven by motor 193 which is energized by source of D.C. potential 194. Grounded arm 195 may be placed on terminal 196, 197 or 198 depending on whether after the first one hundred minutes of operation it is desired to energize the encoder and control circuit every hour, or every even or odd hour. Contacts 199 are connected in parallel and to terminal 198 while contacts 200 are in parallel and are connected to terminal 197. In the position shown in FIG. 6, during even hours, when minute hand 192 sweeps segment 201, a circuit will be completed from terminal SV–3 through relay Ry8, the segment, minute hand 192, hour hand 191, one of the contacts 200, terminal 198, arm 195 to ground, thereby energizing relay Ry8. Two minutes thereafter, a time interval conveniently selected in this embodiment, when minute hand 192 sweeps segment 202, a similar circuit is completed through relay Ry7. It is understood, of course, that relays Ry7 and Ry8 could be energized after any selected time interval and that an hourly or bihourly interval is used for illustration only.

Before discussing a cycle of operation of the embodiment, it will be assumed that, at the start of operation, brushes 53 to 61 in FIG. 5 engage segments A–1 to A–9 respectively, that all relays are in their unenergized position, that read out arm 15, code selector arm 16, and wheel 159 and their associated brushes are in their start positions, that arm 195 in FIG. 6 engages terminal 198, and finally, that pin arm 64 in FIG. 3 is in the position obtained at sea level. With the exception of brushes 153 to 161 and brushes 20 to 23, the above conditions are shown in the drawings. At the start of operation, brushes 20 to 23 are positioned along line 31 in FIG. 4.

Before starting operation, start switch 11 is placed in the lower position in FIG. 7 to operate and thereby test ballast valve 9. Switch 11 is then placed in the upper position so that relay Ry8 is energized by potential applied from terminal SV–3 through the relay, bridge segment 132, in timer commutator 118, brush 25 to ground. Armatures Ry8–1 in FIG. 6 and Ry8–2, Ry8–3 in FIG. 5 are closed. Armature Ry8–1 applies potential from terminal +2 to aspirator 148, activating the same while armature Ry8–2 applies source of D.C. potential 100 across brushes 55 and 59 and armature Ry8–3 applies potential to one side of relay Ry3 in FIG. 5. Motor 12 is energized by a circuit completed from terminal SV–1 through armature Ry1–1 in FIG. 4, the motor, armature Ry1–2, run segment 131 in timer commutator 118, and brush 125 to ground in FIG. 7. A circuit is also completed through terminal PV–2, armature Ry3–1, electromagnet 18 to ground, energizing the electromagnet and magnetically coupling read out arm 15 to code selector arm 16. At the same time, motor 12 drives the read out arm clockwise until brush set 21 engages segment 80 when a circuit is completed from terminal SV–5 through relay Ry1, armatures Ry7–3, Ry4–4, brush 60, segments A–8, brush set 21 to ground. A similar circuit is completed from terminal SV–6 through relay Ry2 to ground, energizing the relay and moving armature Ry2–4 to the lower or closed position in FIG. 4. Since relay Ry1 is also energized, armature Ry1–3 is moved to the lower position in the same figure to close a locking circuit for the relay through reversing ring 37 to ground and armatures Ry1–1, Ry1–2 are moved to the lower position in the figure reversing the direction of rotation of motor 12 and read out arm 15. The read out arm now rotates counterclockwise pulling code selector arm 16 in the same direction until brush set 21 no longer engages reversing ring 37 when the locking circuit for relay Ry1 is broken, armatures Ry1–1, Ry2–2 assume the upper position in the figure and the rotation of motor 12 is reversed, once again driving read out arm 15 in the clockwise direction.

In the discussion below, a cycle of operation will be considered as a counterclockwise and then clockwise rotation of read out arm 15. As the read out arm and code selector arm 16 rotates counterclockwise in the first cycle of operation, when brush 25 engages the first identification segment 49 in its path, relay Ry3 is energized by an obvious circuit completed through the identification segment and brush. Armature Ry3–1 is moved to the lower or open position in FIG. 4 deenergizing electromagnet 18 and decoupling read out arm 15 from code selector arm 16. The code selector arm assumes a position that may be indicated, for example, by dotted line 16A in FIG. 9. In this position, brush 27 grounds fine segment 35D and the segments in ring 40h.

To insure that selector arm 16 will not rotate counterclockwise past line OY in FIG. 9, if the selector arm should rotate to the point where brush 25 engages stop segment 50, a circuit is completed from source of D.C. potential 101 through armature Ry8–3, stop segment 50, brush 25 to ground. Relay Ry3 is energized, and armature Ry3–1 is moved to the lower position in FIG. 4, deenergizing electromagnet 18. Read out arm 15 is decoupled from the selector arm and the latter stops rotating to the right of line OY.

As brush set 23 on read out arm 15 sweeps ring 46 in the counterclockwise direction, relay Ry10 is successively energized by a circuit running from terminal PV-1, armature Ry2-4, common segment 47, brush set 23, each segment in ring 46, segment A-9 in parameter commutator 48, brush 61 to ground. Since successively energizing relay Ry10 keys the output tubes in transmitter 154 and since source of D.C. potential 10 is applied through brush 126, segment 133 to the electron tube filaments in the high frequency section of transmitter 154, transmission of signals represented by the segments in ring 46 is effected. These signals stand for the letter D in Morse code and indicate that code letters representing the telemetering system in operation will presently be transmitted. As read out arm 15 continues to rotate counterclockwise, brush set 23 successively senses each of the segments in ring 40h so that relay Ry10 is again energized successively, this time by a circuit completed through terminal PV-1, common segment 42, each of the segments 40h, segment 35D, brush 27 to ground. This results in transmission of the Morse code signals for the letter H and indicates the telemetering system in operation. On clockwise rotation of read out arm 15, since none of the fine code segments 35 are grounded, transmitter 154 is silent so that in this example only one code letter is sent identifying the telemetering system in operation. When the read out arm rotates clockwise to the point where brush set 21 no longer engages preversing ring 37, the circuit energizing relay Ry2 is broken and armature Ry2-4 moves to the position shown in FIG. 4. Thus, as the read out arm rotates clockwise, ring 46 will not be grounded and undesired signals will not be generated.

During clockwise rotation of read out arm 15 during which the read out arm engages and returns code selector arm 16 to the start position, extension 19 engages a tooth of star wheel 116 and advances the wheel and cam 115 one position. Cam follower 118 on arm 117, riding the cam, advances the arm one step: and since arms 62 and 117 have a common shaft, arm 62 likewise advances one step and brushes 53 to 61 are thereby positioned on segments B-1 to B-9, respectively.

The second sequence of operation, which now occurs, is the same as the first with two major exceptions: (1) ring 45 on main commutator 30, FIG. 4, is grounded for brush 61 engages segment B-8 and (2) relay Ry3 is energized through an obvious circuit when pin arm 64 engages pressure segment 13e. When the relay is energized, code selector arm 16 ceases rotation and may assume a position, for example, that is illustrated by dotted line 16B, FIG. 9, which shows that fine code segment 35B and ring 40b is grounded through brush 26 during counterclockwise rotation of read out arm 15 and coarse code segment 38B and ring 40h will be grounded through brush 28 during clockwise rotation of the read out arm. As read out arm 15 rotates counterclockwise first sweeping the segments in ring 45, signals are generated which represent the letter C in Morse code: then ring 40b is sensed to generate signals in Morse code standing for the letter A. During clockwise rotation of the read out arm, ring 40h is sensed so that Morse code signals for the letter H are generated. The first signals, i.e., for the letter C, indicate that the pressure parameter has been evaluated, and the second and third signals generated, i.e., A and H, indicate the magnitude of the pressure parameter. These signals control relay Ry10 in the same manner as the signals generated in the first sequence of operation set forth in detail above.

During the third sequence of operation, brushes 55 and 59 rest on segments C-3 and C-7 of parameter commutator 48, FIG. 5, and source of D.C. potential 100 is applied across the vertical leg of Wheatstone bridge 111, which includes temperature element 82. Since selector arm 16 is located on the shaft of variable resistor 17, as the selector arm is rotated clockwise the resistance of the variable resistor is varied until the Wheatstone bridge is balanced. A very low or substantially zero potential, developed across the horizontal bridge leg, is then applied to transistor 104 and relay Ry3 is energized decoupling code selector arm 16 from read out arm 15. When the code selector arm stops rotating, if it is in the position shown by dotted line 16C, FIG. 9, during counterclockwise rotation of read out arm 15 ring 44, FIG. 1, is grounded through segment C-9 in parameter commutator 48 and ring 40b is grounded through brush 26 and fine code segment 35C while in FIG. 9 are grounded through coarse code segments 38A, 38B and brushes 28, 29, respectively. Hence, during counterclockwise rotation of read out arm 15, the Morse code letter B is generated, indicating that information on the temperature parameter is to be transmitted and the code letter H is transmitted; during clockwise rotation, since rings 40b and 40h are grounded simultaneously, the "composite" letter B is generated (see FIG. 11.) The letters HB represent the magnitude of the temperature parameter.

In the fourth sequence of operation, brushes 53 to 61 are in contact with segments D-1 to D-9 and the third sequence is repeated except that Wheatstone bridge 112, which includes humidity sensor 92, controls the position of code selector arm 16 and signals designating the humidity parameter and indicating its magnitude are generated and transmitted. Because brush 60 engages segment D-8, clockwise rotation of read out arm 15 is not terminated until brush set 21 engages segment 111 to complete a circuit from terminal SV-5 through relay Ry1, segment 111, brush set 21 to ground, that is, until extension 19 has engaged one of the teeth 160 to advance wheel 159 and extensions 19, 122 in FIG. 1 have advanced wheels 116 and 120, respectively. As wheel 120 advances, arm 117 pivots in the counterclockwise direction on screw thread 121.

As wheel 159 turns counterclockwise, whenever brush 163 engages one of the dash segments 170 to 172, delay Ry10 is energized to transmit a continuous frequency signal for direction finding purposes. The duration of the continuous signal is selected to be the same as the time required for performing four sequences of operation and while the continuous signal is being transmitted, the signals generated under the control of parameter commutator 48, are, of course, blanked out.

For the first ten minutes, operation continues in the manner indicated above, and since the balloon is close to the receiving station, no difficulty is experienced in receiving the transmitted signals. After ten minutes, when brush 123 in timer commutator 118 engages segment 135, source of D.C. potential 10 is applied across the low resistance heating element in antenna and sensor tube release 147. The nylon cord, connected across the element and securing the antenna and sensor tube, is severed thereby releasing the antenna for higher power transmission and positioning the tube so that aspirator 148 may draw cool air over temperature element 82 and humidity sensor 92. When brush 123 engages segment 136, source of D.C. potential 10 is once again applied across the low resistance element insuring that the antenna and sensor tube is in fact released. After sixty-five minutes, brush 123 is positioned on segment 137 in timer commutator 118 so that ballast valve 9 may be energized through an obvious circuit to release ballast if relay Ry9 is operated when the balloon fails to maintain a desired altitude.

During the first sixty-five minutes of operation when the balloon is below a predetermined altitude, pin arm 64 rides on the main termination and lights interleaved spiral 13b closing a circuit through terminal SV-4, relay Ry6, in FIG. 7 and the pin arm to ground. Relay Ry6 is energized, armatures Ry6-1 are placed in the lower position in FIG. 7. The former applies potential from terminal +2 to lights 186 which blink as disc 13 rotates and pin arm 64 intermittently closes the circuit through the interleaved spirals 13b. Main termination relay Ry4 is not energized at this time since brush 12 does not rest on segment 140, timer 118, and ballast is not released, even though armature Ry6–1 is actuated, because brush 123 is not on segment 137.

It is noted that by severing the line between points 76 and 99 it is possible to control the number of cycles of operations during which ballast is released when relay Ry9 is energized.

After sixty-five minutes of operation, when brush 123 engages segment 137, if the balloon has not attained a desired altitude and pin arm is riding on ballast ring 13c, relay Ry9 is energized, armature Ry9–2 is moved to the lower position in FIG. 7 and a circuit is completed from source of D.C. potential 10, brush 123, segment 137, the ballast valve 9 to ground. Ballast is released. Thus, if the balloon does not attain the desired altitude in sixty-five minutes, ballast is dropped so that the balloon will attain the altitude within one hundred minutes.

When pin arm 64 rides on air circle 13d on disc 13, an obvious circuit is closed through motor 179 which operates to fill the balloon with air. Simultaneously, if brush 123 is on segment 137 in timer commutator 118 a locking circuit is completed for relay Ry5 from source of D.C. potential 10, through the brush and segment, armature Ry9–2, relay Ry5, resistor 185, armature Ry5–1 to ground. The locking circuit maintains motor 179 in operation and is broken only when relay Ry9 is energized moving armature Ry9–2 to the lower position in FIG. 7, that is when ballast is released.

When the balloon is in the upper atmosphere, the heating effect of the sun may cause the gas to expand so that some of the gas is forced to leave through the appendix preventing the balloon from exceeding a predetermined altitude. But when the gas is cooled, lift effect is lost, the balloon descends and may become slack. If the balloon descends below a predetermined altitude, a circuit is closed from ground through pin arm 64, ballast segment 13c on disc 13 and relay Ry9 to terminal —1. Relay Ry9 is energized closing a circuit extending from source of D.C. potential 10 through brush 123, segment 137, armature Ry9–2, ballast valve 9 to ground. Ballast valve 9 is energized and ballast is released. When the balloon rises to a selected altitude, pin arm 64 engages air ring 13d, motor 179 and relay Ry5 are energized and relay Ry5 remains locked ballast is again released.

After one hundred minutes, brushes 123 to 129 are positioned on segments 137 to 143 in timer commutator 118. Resistor 155 in transmitter 154, FIG. 6 is shorted by brush 127 and segment 141 so that high power transmission may now be effected. Program commutator 96 cooperating with clock 190 assumes control of the embodiment disclosed. If during this period, the balloon descends below a predetermined level, relay Ry9 is energized by a circuit completed through the ballast ring 13c on disc 13 and pin arm 64 to ground. Armature Ry9–2 is placed in the lower position in FIG. 7, ballast valve 9 is energized, and ballast is dropped. Armature Ry9–1 also placed in the lower position in FIG. 7, grounds motor 12 which starts operation, rotating disc 13. Since segments 94 and 95 on programmer commutator 96, which are tied together by brushes 174, 175, are connected to segments C–8, D–8, respectively, in timer commutator 118, segments 80 and 111 on main commutator 30 are connected together whenever brush 60 engages segments C–8 or D–8. Thus, while ballast is being dropped, read out arm 15 will not rotate clockwise further than segment 80, extension 19 will not engage any of the teeth 159 on wheel 160 to advance the wheel and start a nine minute period of operation discussed below.

When armature 195 is positioned on terminal 198, as shown in FIG. 7, during every even hour the balloon is in the air, hour hand 191 is positioned on one of the segments 199 and a circuit is established through relay Ry8 from terminal SV–3 to ground. Relay Ry8 is energized placing armatures Ry8–1 to Ry8–3 in their lower positions in FIGS. 5 and 6. The first armature applies potential from terminal —2 to aspirator 148, operating the same to blow cool air over temperature element 82 and humidity senser 92 before the readings are taken. Armature Ry8–2 applies D.C. source 100 across brushes 55 and 59 conditioning armature Ry8–3 applies D.C. source 101 to one side of relay Ry3. Two minutes after every even hour, minute hand 192 engages segment 202 and a circuit from terminal SV–3 through relay Ry7 energizes the relay to place armatures Ry7–1 to Ry7–3 in their lower positions in FIG. 4. Armature Ry7–1 grounding motor 12 starts the motor rotating. Armatures Ry7–2 and Ry1–3 open the circuits between terminal SV–5 and segment 80 and between the terminal and reversion ring 37, respectively, so that read out arm 16 rotates clockwise until brush set 21 engages segment 111 when a circuit is completed from terminal SV–5 through relay Ry1 to ground. The latter is energized, armatures Ry1–1, Ry1–2 are moved to their lower positions in FIG. 4 opening the circuit from terminal SV–1 through the motor to ground. The motor, therefore, stops rotating until minute hand 192 moves off segment 202 when relay Ry7–1, Ry7–2 move to their upper position in FIG. 7 and the motor starts rotating the read out arm counterclockwise. In this embodiment, minute hand 192 remains on segment 202 for an interval that is selected to twenty seconds in duration. Other time intervals may, of course, be used as desired.

In the preceding operation, as read out arm 16 rotates clockwise to segment 111, extension 19 engages one of the teeth 160 on wheel 159 to advance the wheel one position so that brushes 161 to 164 and 173 to 175 are positioned on their associated rings in programmer commutator 96. Relay Ry8 is then energized by a circuit running from terminal SV–3, bridge ring 154, brush 164 to ground: run ring 151 is connected to ground through brushes 161 and 162. Source of D.C. potential 10 is applied through brush 128, segment 142 in timer commutator 118, 6 volt ring 156, segment 143, brush 129 in the timer commutator to terminal PV–1 in FIG. 6. As wheel 159 rotates, the potential on 6 volt ring 156 is applied successively through brushes 173, 174 and segments 176, 177, and 153, respectively, to the filaments of the electron tubes in the low, medium and high frequency sections of transmitter 154.

It is apparent that until wheel 159 is stepped to the position where brushes 161 to 164, 173 to 175 no longer engage their respective rings, the telemetering system is under control of programmer commutator 96 and follows essentially the same four sequences of operation as in the first one hundred minutes. The programmer commutator 96 maintains control for time intervals that are selected to be nine minutes in duration: during each successive three minutes in this interval, segments 176, 177 and 153 effect transmission of signals in the low, medium, and high frequency ranges, respectively. It is understood, of course, that the time intervals presented are merely for illustrative purposes and may be varied as desired.

The operation of the present embodiment continues in the manner indicated above until final termination occurs in one of several ways. In the first, during each rotation of wheel 159, brush 175 in programmer commutator 96 sweeps contact 180 so that potential, applied from 6 volt ring 156 and brushes 174, 175 to the contact, energizes termination counter 181. After a predetermined number of energizations, termination counter 181 closes switch 178 completing a circuit from ground through relay Ry6 to terminal SV–4 and a circuit from ground through the switch, relay Ry4, segment 140, brush 126 to source of D.C. potential 10. Relay Ry6 is energized to move armature Ry6–2 to the lower position in FIG. 7 closing a circuit for applying potential to lights 185 and to move armature Ry6–1 to the lower position to close a circuit that energizes ballast valve 9. Main termination relay Ry4 is energized, moving armatures Ry4–1 to Ry4–3 to the lower positions shown in the drawings. Armature Ry4–1 closes a circuit that detonates squib 184, releasing the telemetering system from the balloon and permitting it to parachute to earth: armature Ry4–2 closes a circuit to ground, energizing motor 12. Armature Ry4–3 breaks the circuit between segment 80, segments A–8, B–8 or C–8, brush 61 to ground so that the motor rotates read out arm 15 to segment 111 during each cycle of operation instead of each fourth cycle and programmer commutator 96 maintains control of the telemetering system for a period that has a duration of two and a quarter minutes instead of nine minutes. Thus, the period during which transmitter 154 sends signals in each of the low, medium, and high frequency ranges is decreased from three minutes to three-quarters of one minute. This verifies that operation has been terminated and the telemetering system is descending to earth.

After one hundred minutes of operation, if the balloon descends below a predetermined altitude, pin arm 64 is positioned to sense main termination and lights spirals 13b and thereby close a circuit that energizes relays Ry6, Ry4 to achieve the results indicated immediately above. Lights 185 blink as disc 13 rotates and pin arm 64 alternately senses interleaved spirals 13b.

Referring to FIG. 3, when the balloon ascends control arm 66 is positioned behind knob 68 on pin arm 64 so that armature 69 can not close a circuit to ground which would detonate auxiliary squib 73 as pin arm 64 senses the interleaved auxilliary termination spiral 13a. When the balloon attains a selected altitude, control arm 66 is released and rotating clockwise closes microswitch 67. Armature 69 is then in contact with terminal 71; and if the balloon descends below a desired altitude, a circuit is closed from ground through pin arm 64, auxiliary termination interleaved spirals 13b, microswitch 67, source of D.C. potential 72 to auxiliary squib 73. The latter is detonated and the telemetering system is released from the balloon and parachuted to earth.

At a selected time, occurring after termination counter 181 operates, auxiliary timer 75 closes switch 74 to establish a circuit that will detonate auxiliary squib 73. Thus, the auxiliary timer insures that operation will be terminated even though the circuit including counter 181 does not function properly.

It should be understood, of course, that the foregoing disclosure relates to only a preferred embodiment of the invention and that numerous modifications may be made therein without department from the spirit and scope of the invention set forth in the appended claims.

What is claimed is:

1. In a telemetering system, a code selecting member, a read out member, means for coupling said code selecting member to said read out member, a coded member including a plurality of segments arranged in a surface of said coded member in a selected code pattern, means for positioning said code selecting member and said read out member in contact with said surface, means for moving said read out member and said code selecting member relative to said plurality of segments, evaluating means for evaluating at least one parameter, means connected to said evaluating means for decoupling said read out member from said code selecting member so that the code selecting member is positioned in contact with a selected one of said plurality of segments in dependency upon the magnitude of said parameter, and means connected to said read out member and said plurality of segments for transmitting signals representing the selected segment.

2. In a telemetering system, a code selecting member having at least one pair of brushes, a read out member, means for coupling said code selecting member to said read out member, a coded member including selecting segments and a plurality of groups of segments arranged in a surface of said coded member in a selected code, each group representing a predetermined letter in said selected code and at least one of said selecting segments being connected to a respective one of said group of segments, means for positioning said code selecting member and said read out member in contact with said surface, means for moving said read out member and said code selecting member relative to said coded member, means for successively evaluating the magnitude of a plurality of parameters in successive time intervals, means for decoupling said code selecting member from said read out member in dependency upon the magnitude of said parameters so that at least one of said pair of brushes is positioned in contact with at least a desired one of said selecting elements during successive time intervals, and means connected to said read out arm and said groups of segments for transmitting signals representing the group of segments associated with the desired selecting segment.

3. In a commutator, a code selecting member, a read out member, means for coupling said code selecting member to said read out member, a coded member having a plurality of segments arranged in a surface thereof in a selected code pattern, means for positioning said code selecting member and said read out member in contact with said surface, means for moving said read out member and said code selecting member relative to said plurality of segments, and means for selectively decoupling said read out member from said code selecting member.

4. In a commutator, a code selecting member, a read out member, a coded member including selecting segments and a plurality of groups of segments arranged in a surface in said coded member in a selected code, each group representing a predetermined letter in said selected code and at least one of said selecting segments being connected to a respective one of said groups of segments, means for positioning said code selecting member and said read out member in contact with said surface, means for moving said read out member and said code selecting member relative to said coded member, and means for selectively decoupling said read out member from said code selecting member so that the code selecting member is positioned in contact with at least a one of said selecting segments.

5. In a commutator, a code selecting member, a read out member, a coded member including selecting segments and a plurality of groups of segments arranged in a surface in said coded member in a selected code, each group representing a predetermined letter in said selected code and at least one of said selecting segments being connected to a respective one of said groups of segments, means for positioning said code selecting member and said read out member in contact with said surface means for moving said read out member and said code selecting member relative to said coded member, a stop segment located in said surface, means for evaluating a selected one of a plurality of parameters, means for decoupling said read out member from said code selecting member, and means for connecting said stop segment and the output of said evaluating means to said last mentioned means.

6. In a commutator, a code selecting member having at least a pair of brushes, a read out member, a coded member including selecting segments and a plurality of groups of segments arranged in a first surface in said coded member in a selected code, each group representing a predetermined letter in said selected code and at least one of said selecting segments being connected to a respective one of said groups of segments, means for selectively positioning at least one of said pair of brushes in contact with at least one of said selecting segments, means for positioning said read out member in contact with the first surface of said coded member, means for moving said read out member relative to said coded member in a first and in a second direction, and means for grounding one brush of said pair of brushes when said read out member moves in said first direction and the other brush of said pair of brushes when said read out member moves in the second direction.

7. In a commutator, a code selecting member having at least a pair of brushes, a read out member, means for coupling said code selecting member to said read out member, a coded member including selecting segments and a plurality of groups of segments arranged in a first surface in said coded member, each group representing a predetermined letter in said selected code and at least one of said selecting segments being connected to a respective one of said groups of segments, means for positioning said code selecting member and said read out member in contact with the first surface of said coded member, means for moving said read out member and said code selecting member relative to said coded member, means for selectively decoupling said read out member and said code selecting member so that at least one of said pair of brushes is positioned in contact with at least one of said selecting segments, means for moving said read out member relative to said coded member in a first and a second direction, and means for grounding one brush of said pair of brushes when said read out member moves in said first direction and the other brush of said pair of brushes when said read out member moves in the second direction.

8. In a commutator, a code selecting member having at least a pair of brushes, a read out member, means for coupling said code selecting member to said read out member, a coded member including selecting segments, a plurality of first group of segments and a plurality of second groups of segments arranged in a first surface in said coded member, each first and second group representing a predetermined letter in said selected code and at least one of said selecting segments being connected to a respective one of said first groups of segments, means for grounding a selected one of said second group of segments, means for positioning said code selecting member and said read out member in contact with the first surface of said coded member, means for moving said read out member and said code selecting member relative to said coded member, means for selectively decoupling said read out member and said code selecting member so that at least one of said pair of brushes is positioned in contact with at least one of said selecting segments, means for moving said read out member relative to said coded member in a first and in a second direction, and means for grounding one brush of said pair of brushes when said read out member moves in a first direction and the other brush of said pair of brushes when said read out member moves in the second direction.

9. In combination: a bridge circuit including a variable impedance element having a shaft and a wiping arm, means connected to said wiping arm for providing an output signal dependent upon the position of said wiping arm; a commutator comprising a code selecting member positioned on the shaft of said variable impedance element, a read out member, means for coupling said code selecting member to said read out member, a coded member having a plurality of segments arranged in a surface thereof in a selected code pattern, means for positioning said code selecting member and said read out member in contact with said surface, means for moving said read out member and said code selecting member relative to said plurality of segments and means responsive to the output of the signal of said first mentioned means for decoupling said read out member from said code selecting member.

10. In combination: a group of bridge circuits comprising at least a first and second impedance element connected in series between a first and second terminal, at least a third and fourth impedance element connected in series between a third and fourth terminal, means for grounding a point between said first and second impedance element and a point between said third and fourth impedance element, a variable impedance element including a shaft and a wiping arm, an indicating device connected between said wiping arm and ground, a first switch connected between said first and third terminal, a second switch connected between said second and fourth terminal, means for connecting said variable impedance device between said first and second switch; a commutator comprising a code selecting member positioned on the shaft of said variable impedance element, a read out member, means for coupling said code selecting member to said read out member, a coded member having a plurality of segments arranged in a surface thereof in a selected code pattern, means for positioning said code selecting member and said read out member in contact with said surface, means for moving said read out member and said code selecting member relative to said plurality of segments; and means responsive to the output of said indicating device for decoupling said read out member from said code selecting member.

11. In combination: a plurality of bridge circuits including a variable impedance element having a wiping arm, indicating means connected to said wiping arm for providing an output signal dependent upon the position of said wiping arm; a commutator including a code selecting member, a read out member having an extension positioned thereon, a coded member, means for positioning said code selecting member and said read out member in contact with said coded member, means for moving said read out member and said code selecting member relative to said coded member in a first direction in a first time interval and in a second direction in a second time interval; a circuit selector including an arm having brushes positioned in contact with a surface of a member, said surface having a plurality of segments positioned therein, means positioned relative to said extension for displacement in response to contact with said extension during said second time interval, means dependent upon the displacement of said last mentioned means for displacing said arm in a selected direction; decoupling means for decoupling said read out member from said code selecting member; means for connecting said indicating means and decoupling means to respective one of said segments, and means for connecting said variable impedance element and said indicating means to respective one of said brushes.

12. In a control circuit, a member having a surface of nonconductive material, at least a first area and a second area of conductive material located in said surface, a first and a second arm, said first arm being grounded and having a sensing element positioned in contact with said surface, means for moving said first and second arm to a plurality of positions, one of the positions of said second arm being a control position, means located on said first arm and positioned in contact with said second arm for preventing said second arm from moving to said control position while said first arm is located in at least a selected one of said plurality of positions, means connected to said first arm and said first area for performing a desired function, and means connected to said second arm and between said first arm and second area for performing another function.

13. In a control circuit, a movable member having a surface of nonconductive material, a plurality of first conductive areas, each positioned in said surface between a respective pair of second conductive areas, all said first areas being connected together and all said second areas being connected together, a nonconductive area located in said surface between one of said first and second conductive areas, means for displacing said movable member, at least a first and second arm, said first arm being grounded and having a sensing element positioned in contact with said surface, means for moving said first and second arm to a plurality of positions, one of the positions of said second arm being a control position, means located on said first arm and positioned in contact with said second arm for preventing said second arm from moving to said control position when said first arm is located in selected ones of said plurality of positions, means connected to said first arm and said first conductive areas for performing a first function, and means connected to said second arm and between said first arm and second conductive areas for performing a second function.

14. A commutator and control circuit comprising a member having a surface of nonconductive material, said first mentioned surface having at least one area of conductive material located therein, an arm having a sensing element positioned in contact with said first mentioned surface, means for moving said arm to a plurality of positions, a code selecting member, a read out member, means for coupling said code selecting member to said read out member, a coded member including a plurality of segments arranged in a surface thereof in a selected code pattern, means for positioning said code selecting member and said read out member in contact with said last mentioned surface, means for moving said read out member and said code selecting member relative to said plurality of segments, and means connected between said arm and said area of conductive material for selectively decoupling said read out member from said code selecting member.

15. In a commutator and control circuit a member having a surface of nonconductive material, at least a first area and a second area of conductive material located in said first mentioned surface, a first and second arm, said first arm being grounded and having a sensing element positioned in contact with said first mentioned surface, means for moving said first and second arm to a plurality of positions, one of the positions of said second arm being a control position, means located on said first arm and positioned in contact with said second arm for preventing said second arm from moving to said control position while said first arm is located in at least a selected one of said plurality of positions, means connected to said second arm and between said first arm and said second area for performing a desired function, a code selecting member, a read out member, means for coupling said code selecting member to said read out member, a coded member including a plurality of segments arranged in a surface thereof in a selected code pattern, means for positioning said code selecting member and said read out member in contact with said last mentioned surface, means for moving said read out member and said code selecting member relative to said plurality of segments, and means connected between said first arm and said first area for selectively decoupling said read out member from said code selecting member.

16. In combination: a bridge circuit including a variable impedance element having a shaft and a wiping arm, indicating means connected to said wiping arm for providing an output signal dependent upon the position of said wiping arm; a control circuit including a member having a surface of nonconductive material, said first mentioned surface having at least one area of conductive material located therein, an arm having a sensing element positioned in contact with said first mentioned surface, means for moving said arm to a plurality of positions; a commutator including a code selecting member, a read out member, means for coupling said code selecting member to said read out member, a coded member including a plurality of segments arranged in a surface thereof in a selected code pattern, means for positioning said code selecting member and said read out member in contact with said last mentioned surface, means for moving said read out member and said code selecting member relative to said plurality of segments; means for decoupling said read out member from said code selecting member; a circuit selector connected to said decoupling means; means connecting said indicating means and said area of conductive material to said circuit selector.

17. In a telemetering system for the transmission of a pulse signal representative of the value of a quantity to be measured, an information surface; first and second carriage means adapted to traverse said surface, carriage conveyance means for conveying said first carriage means over a selected route across said surface; means for coupling said second carriage means to said first carriage means such that said second carriage means is towed across said surface as said first carriage means is conveyed thereacross, said means for coupling including disengaging means adapted to disengage said first and second carriage means; said information surface having at least a pulse code selector portion, wherein pulse codes are representative of location on said surface with respect to a reference point thereon, and a pulse generation portion; said second carriage means adapted to provide at least one pulse code selection upon disengagement from said first carriage means within said code selector portion of said surface; said first carriage means adapted to generate a pulse signal in accordance with said pulse code selection as said first carriage traverses said pulse generation portion of said surface; a balanced bridge network including an impedance having a value representative of the value of said quantity to be measured and a variable balance impedance for balancing said bridge network; means connecting said second carriage means to said variable balance impedance such that the location of said second carriage means with respect to said reference point on said surface is representative of the impedance value of said variable balance impedance; and means connecting said disengaging means of said coupling means to said balanced bridge network such that said first and second carriage means are disengaged when said network is in its balanced condition.

18. The structure as defined in claim 17 wherein said information surface comprises a selected arrangement of electrically conductive and non-conductive regions; said first and second carriage means each includes electrical contact means; and said conveyance means is adapted to provide contact between said carriage means and said surface.

19. The structure as defined in claim 17 wherein said conveyance means includes reversing means for reversing the direction of conveyance and means for actuating said reversing means upon completion of traversal of said surface in at least one direction.

20. The structure as defined in claim 19 wherein said means for actuating said reversing means actuates upon completion of traversal of said surface in both directions.

21. The structure as defined in claim 20 wherein said first carriage means is adapted to generate a pulse signal in accordance with said pulse code selection prior to actuation of said reversing means.

22. The structure as defined in claim 20 wherein said first carriage means is adapted to generate a pulse signal following actuation of said reversing means.

23. The structure as defined in claim 20 wherein said second carriage means is adapted to provide at least two code selections upon disengagement and means are provided for generating at least one pulse signal prior to and at least one pulse signal following actuation of said reversing means.

24. The structure as defined in claim 18 wherein said conveyance means includes reversing means for reversing the direction of conveyance and means for actuating said reversing means upon completion of traversal of said surface in at least one direction.

25. The structure as defined in claim 24 wherein said means for actuating said reversing means actuates upon completion of traversal of said surface in both directions.

26. The structure as defined in claim 25 wherein said first carriage means is adapted to generate a pulse signal in accordance with said pulse code selection prior to actuation of said reversing means.

27. The structure as defined in claim 25 wherein said first carriage means is adapted to generate a pulse signal following actuation of said reversing means.

28. The structure as defined in claim 25 wherein said second carriage means is adapted to provide at least two code selections upon disengagement and means are provided for generating at least one pulse signal prior to and at least one pulse signal following actuation of said reversing means.

29. The structure as defined in claim 17 wherein said pulse selector portion and said pulse generation portion are disposed about a centerpoint on said surface and said first and second carriage means are adapted to pivot about said center point.

30. The structure as defined in claim 18 wherein said pulse selector portion and said pulse generation portion are disposed about a centerpoint on said surface and said first and second carriage means are adapted to pivot about said center point.

References Cited in the file of this patent
UNITED STATES PATENTS

| | | |
|---|---|---|
| 1,864,074 | Krum | June 21, 1932 |
| 2,098,227 | Chauveau | Nov. 9, 1937 |
| 2,771,600 | Wright | Nov. 20, 1956 |
| 2,932,733 | Paulson | Apr. 12, 1960 |